No. 849,851. PATENTED APR. 9, 1907.
E. C. OLIVER.
SPEED INDICATOR.
APPLICATION FILED AUG. 2, 1906.

2 SHEETS—SHEET 1.

WITNESSES

INVENTOR
EDD C. OLIVER
BY
HIS ATTORNEYS

No. 849,851.　　　　　　　　　　　　　　　　PATENTED APR. 9, 1907.
E. C. OLIVER.
SPEED INDICATOR.
APPLICATION FILED AUG. 2, 1906.

2 SHEETS—SHEET 2.

WITNESSES
A. M. Walstrom
J. B. Eva

INVENTOR
EDD C. OLIVER
BY Paul & Paul
HIS ATTORNEYS

UNITED STATES PATENT OFFICE.

EDD C. OLIVER, OF MINNEAPOLIS, MINNESOTA, ASSIGNOR OF ONE-HALF TO H. E. PENCE, OF MINNEAPOLIS, MINNESOTA.

SPEED-INDICATOR.

No. 849,851.     Specification of Letters Patent.     Patented April 9, 1907.

Application filed August 2, 1906. Serial No. 328,831.

*To all whom it may concern:*

Be it known that I, EDD C. OLIVER, of Minneapolis, Hennepin county, Minnesota, have invented certain new and useful Improvements in Speed-Indicators, of which the following is a specification.

The object of my invention is to provide a speed-indicator of simple but durable construction and one which will be positive and reliable in its action.

A further object is to provide an indicator having a dial with uniform spaces between the graduations.

A further object is to provide a speed-indicator which will be accurate for low as well as high speeds.

A still further object is to provide an indicating mechanism which though sensitive and capable of accurately indicating the rate of speed will not be materially affected by the jolting or jarring incident to the use of a device of this kind on rough roads.

The invention consists generally in a shaft, a ring centrally pivoted thereon and provided with a cam-surface and having operative connections with an indicating-hand, and a spring arranged to bear on said cam-surface and put under tension by the oscillation of said ring when said shaft is revolved.

Further, the invention consists in various constructions and combinations, all as hereinafter described, and particularly pointed out in the claims.

Figure 1:
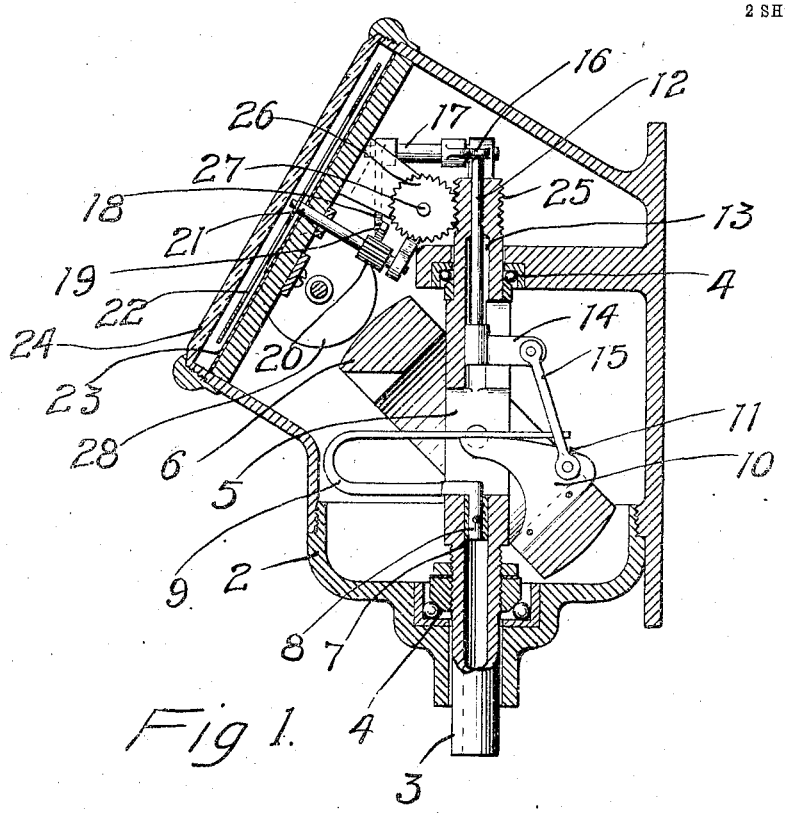
Figure 2:
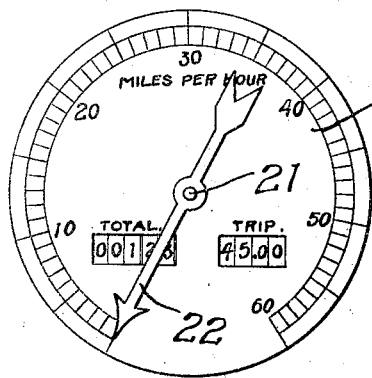
Figure 3:
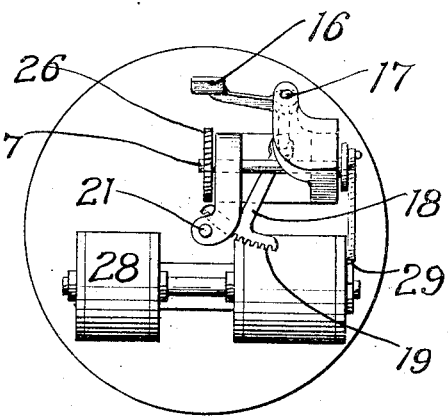
Figure 4:
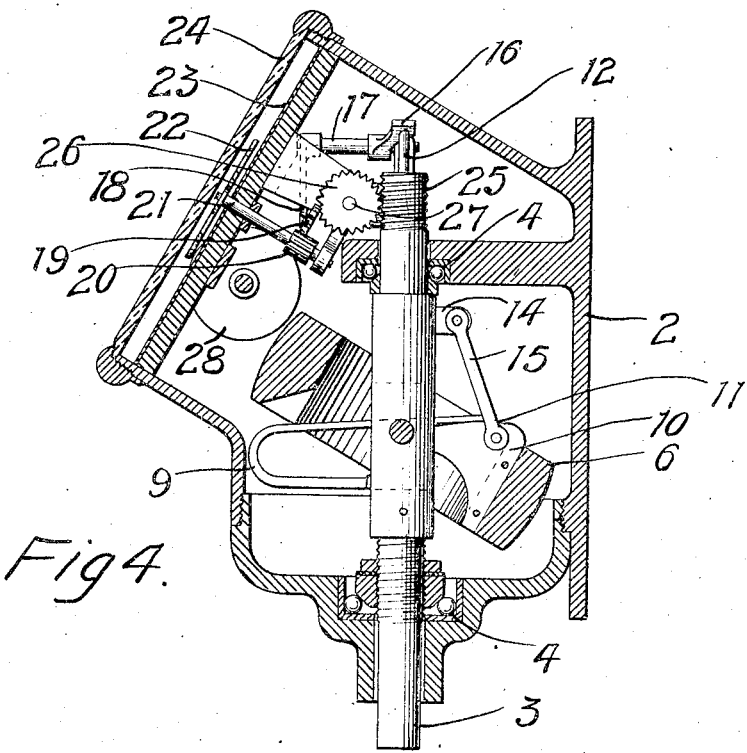
Figure 5:
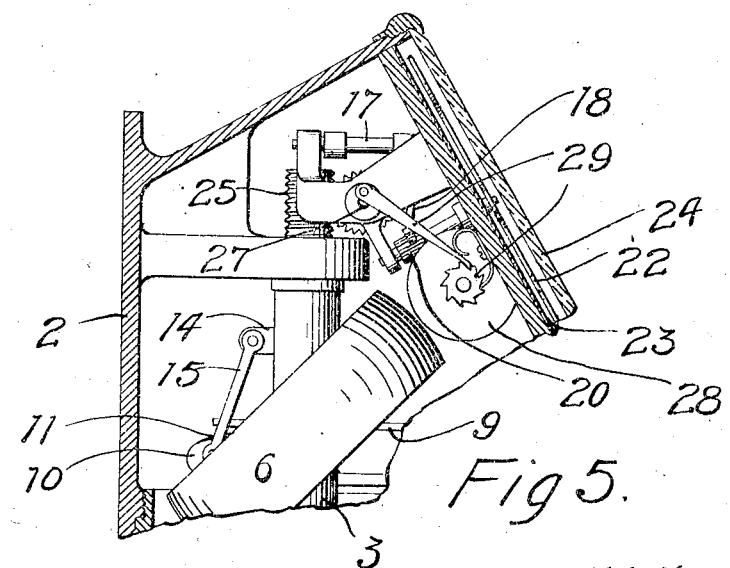

In the accompanying drawings, forming part of this specification, Figure 1 is a vertical sectional view of a speed-indicator embodying my invention. Fig. 2 is a view of the dial. Fig. 3 is a rear view. Fig. 4 is a view similar to Fig. 1, showing the ring thrown out by centrifugal force. Fig. 5 is a view illustrating the mechanism for transmitting the movement of said ring to suitable registers employed in connection with the indicating device.

In the drawings, 2 represents a casing or housing wherein the operating parts of the indicator are mounted.

3 is a shaft connected by any suitable means (not shown) with some moving part of the automobile whose speed it is desired to indicate or with a piece of stationary machinery on which the indicating device may be used. This shaft has ball-bearings 4 at each end in said housing and a slot 5 between said bearings inclosed by a pivoted ring 6. This ring normally occupies the position indicated in Fig. 1 in a plane at an acute angle to the longitudinal axis of the shaft, but with its axis coincident with the center of the shaft. When the shaft is revolved, centrifugal force will cause the ring to oscillate on its pivot and gradually approach a position substantially at right angles to the shaft. The shaft is provided with a socket 7, wherein the end 8 of a spring 9 is inserted. This spring is substantially U-shaped in form, the end 8 forming a depending extension of one side, while the opposite side or end of the spring extends horizontally through the slot 5 in the shaft.

A plate 10 is fastened in the ring 6 and has a cam-surface 11, which engages the free end of the spring 9 and rocks thereon during the oscillation of the ring. When the ring is oscillated by the revolution of the shaft, the cam-surface will rock on the free end of the spring and lift upward on the same, gradually putting it under tension, the power of the spring being exerted to hold the cam and ring in their normal positions with respect to the shaft. The increase in the tension of the spring will be accurately determined commensurate with the travel of the ring, so that the motion can be transmitted by suitable mechanism to an indicating device. Any suitable mechanism may be employed; but I prefer the one shown herein, which consists of a pin 12, slidably mounted in a socket 13 in the upper part of the shaft 3 and carrying an arm 14, which is connected with the plate 10 by a link 15. As the ring 6 is oscillated by centrifugal force and the cam-surface rocks on the spring and puts it under tension the pin will be gradually raised, its movement being proportional to the speed, and engaging an arm 16 on a rock-shaft 17 will oscillate the same and cause a corresponding movement to an arm 18, provided at its lower end with a rack 19, which meshes with a pinion 20 on the post 21 of an indicating-hand 22. This hand operates back and forth over a dial 23 having uniform graduations and mounted in said casing beneath a dial-plate 24.

The upper end of the shaft 3 is provided with threads 25, meshing with a wheel 26 on a shaft 27. Suitable registers 28 are operated from this shaft by means of a ratchet device 29. When the device is in use and the shaft 3 is revolved, the ring will begin to oscillate, and as it moves toward a horizontal position the cam-surface 11 will rock on the spring, and as the tension of the spring is proportionate to the distance between the graduations on the dial the ratio of increase in the speed of revolution of the shaft will be accurately transmitted from the centrifugal ring to the indicator-hand, and the driver of the automobile or the machine attendant can determine instantly by glancing at the dial how great a speed the machine has attained. As soon as the speed slackens the centrifugal ring will swing to its former position, the spring will be relieved of its tension, and the indicator-hand will be allowed to return to zero. When the ring or the weight is in its normal position, (at rest,) the spring and cam will be in contact at the center of oscillation of the ring-weight, where the leverage is zero, and I am thus able to indicate accurately a very low speed.

It will be noted in this device that for any speed the center of mass of the revolving ring does not move away from, but remains at the center of rotation of the shaft and also at the center of oscillation of the weight, a condition which prevents any vibration or jarring of the indicator-hand due to the shaking of the instrument as the machine passes over rough roads. It will also be seen that in my improved construction as the speed increases and the cam and spring rock one upon the other that while the leverage on the cam is increased the length of the spring is also increased and its tension thereby weakened, with the result that the length of contact-surface on the cam is increased and a more accurate outline for the cam provided, all of which is particularly essential for low speeds.

I claim as my invention—

1. A speed-indicating device actuated by centrifugal force, comprising a rotating spindle, a spring mounted thereon, a ring centrally pivoted on said spindle, a cam mounted on said ring and adapted to rock on said spring, and said spring being put under tension by the outward movement of said ring, a dial having uniform graduations and an indicator-hand arranged to travel over said graduations and operatively connected with said cam, substantially as described.

2. A speed-indicating device comprising a rotating spindle or shaft, a ring centrally pivoted thereon and normally in an oblique position with respect to said spindle but adapted to swing toward a horizontal position as the speed rises, a spring mounted on said spindle, a cam mounted on said ring and arranged to bear on said spring and move back and forth thereon with the oscillation of said ring, and a dial having an indicating-hand operatively connected with said cam, substantially as described.

3. An indicating device comprising a rotating spindle, a ring centrally pivoted thereon, and adapted to swing from an oblique toward a horizontal position when the speed of the spindle rises, a U-shaped spring having one end mounted in said spindle and its free end extending transversely with respect thereto, a cam mounted on said ring and having a surface engaging the free end of said spring and adapted to rock thereon, the effective length of the spring increasing as the cam-surface moves outwardly thereon, and a dial having an indicating-hand operatively connected with said cam.

4. In a speed-indicating device, a rotating ring adapted to swing outwardly by centrifugal force from the axis of rotation, a cam mounted on said ring, a dial having uniform graduations and an indicating-hand operatively connected with said cam, and a spring arranged to bear on said cam and whose effective length increases with the oscillation of said ring from its axis of rotation, substantially as described.

5. In a speed-indicating device actuated by centrifugal force, the combination with a rotating spindle, of a ring pivoted thereon, the center of mass of said ring remaining substantially at the center of rotation during the oscillation of the ring, a cam mounted on said ring and passing substantially through the center of oscillation, a spring acting on said cam the effective length of said spring being increased as the speed of rotation increases, an indicating device and means for transmitting the movement of said ring to said indicating device.

6. In a speed-indicating device the combination, with a rotating spindle, of a weight centrally pivoted thereon, and having a cam-surface and spring arranged to bear on said cam, the effective length of said spring being increased as the speed of rotation increases, substantially as described.

In witness whereof I have hereunto set my hand this 23d day of July, 1906.

EDD C. OLIVER.

Witnesses:
  RICHARD PAUL,
  J. B. ERA.